United States Patent [19]
Rodman et al.

[11] Patent Number: 5,757,547
[45] Date of Patent: May 26, 1998

[54] HIGH EFFICIENCY HOMOGENEOUS POLARIZATION CONVERTER

[75] Inventors: Jeffrey C. Rodman, San Francisco; Brian L. Hinman, Los Gatos; Pasquale Romano, San Jose, all of Calif.; Arlie R. Conner, Tualatin, Oreg.

[73] Assignee: Polycom, Inc., San Jose, Calif.

[21] Appl. No.: 427,577

[22] Filed: Apr. 24, 1995

[51] Int. Cl.$^6$ ...................................... G02B 5/30
[52] U.S. Cl. .......................... 359/497; 359/487
[58] Field of Search ....................... 359/485, 487, 359/497; 349/9, 96

[56] References Cited

U.S. PATENT DOCUMENTS

| | | | |
|---|---|---|---|
| 2,748,659 | 6/1956 | Geffcken et al. | 359/487 |
| 4,124,278 | 11/1978 | Grinberg et al. | 349/17 |
| 4,634,880 | 1/1987 | Lindow et al. | 250/566 |
| 4,740,061 | 4/1988 | Miura | 359/320 |
| 4,913,529 | 4/1990 | Goldenberg et al. | 349/9 |
| 4,962,997 | 10/1990 | Baldwin | 349/8 |
| 5,013,140 | 5/1991 | Healey et al. | 349/196 |
| 5,042,921 | 8/1991 | Sato et al. | 359/40 |
| 5,073,830 | 12/1991 | Loucks | 359/495 |

(List continued on next page.)

FOREIGN PATENT DOCUMENTS

| | | | |
|---|---|---|---|
| 1372436 | 8/1964 | France | 359/487 |
| 296391 | 4/1954 | Switzerland | 359/487 |

OTHER PUBLICATIONS

Weber, M. F., "Retroreflecting Sheet Polarizer", SID 92 Digest, 1992, pp. 427–429.

Nicolas, C., Loiseaux, B., Huignard, J.P., "Analysis of the Optical Components in Liquid Crystal Projectors by Their Geometrical Extend", Orsay, France pp. 537–539.

Imai, M., Shiratori, H., Tashiro, Y., Sakamoto, M., Kubota, K., "A Novel Polarization Converter for High–Brightness Liquid Crystal Light Valve Projector", Kawasaki, Japan, pp. 257–260.

De Vaan, A.J.S.M., Van De Brandt, A.H.J., Karsmakers, R.A.M., Stroomer, M.V.C., Timmers, W.A.G., "Polarization Conversion System LCD Projection", Eindhoven, The Netherlands, pp. 253–256.

Stroomer, M.V.C., "LC Projection", Eindhoven, The Netherlands, pp. 243–246.

*Primary Examiner*—Jon W. Henry
*Assistant Examiner*—Darren E. Schuberg
*Attorney, Agent, or Firm*—Carr & Ferrell LLP

[57] ABSTRACT

A polarization converter for polarizing a light beam by converting all light waves to the same orientation comprises 1) a first beam dividing matrix of refractory material for dividing a single, large light beam into smaller sub-beam 2) a second beam focusing matrix for polarizing select portions of the sub-beams, and 3) a series of narrow and shallow polarizing cells. The second beam focusing matrix further comprises a plurality of concave lenses for redirecting each sub-beam and quarter wave retarders disposed in alignment with, and adjacent to, the reflective side of an equal plurality of mirror segments. The polarizing cells include either a first beamsplitter or a second beamsplitter, where the first beamsplitters and second beamsplitters are disposed in opposing diagonal fashion and in an alternating manner. Lightwaves of a selected polarization pass directly through the first beamsplitter and out of the polarizing cell, while all other lightwaves are horizontally reflected by the first beamsplitter and directed onto the second beamsplitter where they are redirected toward the quarter wave retarder. The reflected light passes through the quarter wave retarder, reflects off of the mirror and again passes through the quarter wave retarder. The wavelength of the light is retarded ninety degrees as a result of the two passes through the quarter-wave retarder, thus re-orienting the light to the selected orientation. The re-oriented p-waves pass through the second beamsplitter and exit the polarizing cell, join the original p-waves exiting the polarizing cells, and form a beam of polarized light.

12 Claims, 4 Drawing Sheets

U.S. PATENT DOCUMENTS

| | | | |
|---|---|---|---|
| 5,153,752 | 10/1992 | Kurematsu et al. | 359/40 |
| 5,172,254 | 12/1992 | Atarashi et al. | 359/41 |
| 5,181,054 | 1/1993 | Nicolas et al. | 353/20 |
| 5,200,843 | 4/1993 | Karasawa et al. | 359/40 |
| 5,272,496 | 12/1993 | Nicholas et al. | 353/34 |
| 5,283,600 | 2/1994 | Imai | 353/34 |
| 5,303,083 | 4/1994 | Blanchard et al. | 359/495 |
| 5,305,136 | 4/1994 | Smith | 359/247 |
| 5,317,445 | 5/1994 | DeJule et al. | 359/250 |
| 5,327,270 | 7/1994 | Miyatake | 359/63 |
| 5,381,278 | 1/1995 | Shingaki et al. | 359/256 |
| 5,566,367 | 10/1996 | Mitsutake et al. | 359/485 |

HIGH EFFICIENCY HOMOGENEOUS POLARIZATION CONVERTER

BACKGROUND OF THE INVENTION

1. Field of the Invention

This invention relates generally to light polarization, and more particularly to an apparatus for converting non-polarized light into polarized light, where an array of small polarizing cells comprises a flat, molded panel having a reduced thickness and reduced weight, where the panel provides a highly efficient means for polarizing light.

2. Description of the Background Art

Linearly polarized light is light for which the spatial orientation of its electric field lies entirely within one plane. The conventional approach to linearly polarizing light is to use a filter that simply absorbs light of the wrong polarization, passing only light of a chosen linear polarization. This results in linearly polarized light, but at the cost of losing over fifty percent of the incident light available.

Subsequent improvements to polarizing light include use of a beamsplitter and a retarder instead of a filter. See U.S. Pat. No. 5,283,600. In the prior art, a beam of light is directed to a beamsplitter, where light of the desired polarization passes directly through the beamsplitter and out the exit, while the rest of the light (light not of the desired polarization) is reflected horizontally to an adjacent mirror. The light is again reflected and passes vertically through a half-wave retarder which rotates the axis of orientation of the light to the desired polarization. The main disadvantage of this system is size. The size of the beamsplitter must be greater than or equal to the size of the incoming beam of light in order to accommodate and process all of the available light. Further, the exiting light beam is twice the width of the incoming non-polarized light, as light exits through both the beamsplitter and the adjacent retarder. Therefore, the larger the beam of incoming light, such as that used for an overhead projection system, the larger the polarizer must be to accommodate the incoming beam. Such a large size is undesirable for laptop computers and other small-sized component applications.

What is needed is a small, flat, lightweight panel suitable for laptop computers and overhead projectors that comprises a series of narrow, shallow polarizing cells that will polarize all of the incident light in a light beam.

SUMMARY OF THE INVENTION

The present invention is a high efficiency homogenous polarization converter for polarizing the spatial orientation of the electric field in a light beam by converting all light waves to the same orientation.

The polarization converter of the present invention preferably comprises a first beam dividing matrix of refractory material for dividing a single, large light beam into smaller sub-beams. The first beam dividing matrix further comprises rows of adjacently disposed convex cylindrical lenses. As a light beam is transmitted through the first matrix, the lenses cause the light beam to be broken up into a plurality of smaller sub-beams by refracting the light passing through each lens to create a plurality of sub-beams. Each sub-beam is equal in size to the lens' cross-sectional width, and the width of the sub-beams gradually narrows as the light travels farther away from the lens. The parallel formation of the lenses comprising the first matrix assures that every portion of the incoming light beam passing therethrough is captured and refracted into one of the many sub-beams.

The polarization converter of the present invention also preferably comprises a second beam focusing matrix of refractory material combined with means for reorienting select portions of the sub-beams. The second beam focusing matrix further comprises a plurality of concave lenses, for redirecting each sub-beam, and means for reorienting the s-wave components within the sub-beams to change them into p-wave orientation.

The sub-beams from the first matrix are directed onto the lenses of the second matrix, where the lenses collimate the sub-beams so that the light rays comprising each resultant sub-beam are disposed in parallel. The reorienting means are integrated in alternating arrangement with the concave lenses, and comprise quarter wave retarders in alignment with, and adjacent to, the reflective side of an equal plurality of mirror segments.

The polarization converter of the present invention further preferably comprises a series of narrow and shallow polarizing cells, disposed in rows. Each polarizing cell further includes either a first beamsplitter or a second beamsplitter, where the first beamsplitters and second beamsplitters are disposed in opposing diagonal fashion and in an alternating manner. The polarizing cells are aligned with the second matrix such that the resultant sub-beams from the lenses of the second matrix are directed into a polarizing cell having a first beamsplitter. Likewise, each polarizing cell having a second beamsplitter is aligned with one of the plurality of reorienting means.

In operation, a light beam passing through the convex cylindrical lenses of the first matrix produces discrete sub-beams having ever narrowing beam widths. The sub-beams are focused onto corresponding lenses in the second matrix. The corresponding lenses again refract the sub-beams, to cause parallel alignment of the light rays comprising the resultant sub-beam. The resultant sub-beam is directed into the polarizing cell having the first beamsplitter. Lightwaves having p-wave polarization pass directly through the first beamsplitter and out of the polarizing cell. Lightwaves having s-wave polarization (all other lightwaves) will be horizontally reflected by the first beamsplitter and directed onto the second beamsplitter. The second beamsplitter, in turn, once again reflects the s-waves, and directs them toward the polarizing means. The s-waves pass through the quarter wave retarder, where the wavelength of each s-wave is delayed by one-quarter, causing the s-waves to become circularly polarized. The s-waves then reflect off of the mirror and again pass through the quarter wave retarder, which returns the s-waves to a linear polarization from their circular polarization. The s-waves are again delayed by one quarter, thus converting the effective rotation axis ninety degrees as a result of the two passes through the quarter-wave retarder. Thus, the s-waves are now re-orientated as p-waves as the result of being rotated ninety degrees. The re-oriented p-waves pass through the second beamsplitter and exit the polarizing cell. The re-oriented p-waves join the original p-waves exiting the polarizing cells having the first beamsplitter to form a full beam of polarized light.

The first matrix, second matrix and polarizing cells are disposed in parallel planes and combined into a single unit. Such a unit can be manufactured in a mass-producible manner by a combination of conventional lens molding and vacuum deposition processes. The panel overcomes the size and weight problems of the conventional polarizer by utilizing a series of narrow, shallow polarizing cells. The reduction in thickness results in a very substantial reduction in weight. By using a series of polarizing cells, the panel can be produced as a flat, lightweight molded unit, suitable for laptop computers, overhead projectors, or anywhere a lightweight, efficient source of polarized light is needed.

DETAILED DESCRIPTION OF THE PREFERRED EMBODIMENT

Figure 1A:
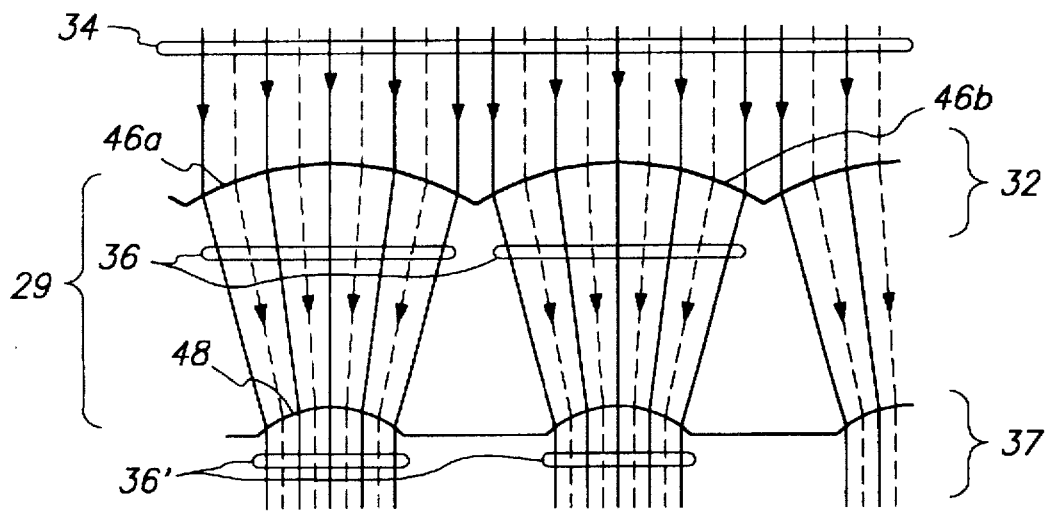
FIG. 1a is a cross-section of a portion of a preferred light concentrator in accordance with the present invention.

Referring now to FIG. 1a, a light concentrator 29 comprises a first beam dividing matrix 32 for dividing a single, large light beam 34 into smaller sub-beams 36, and a second beam focusing matrix 37 for collimating the concentrated light to provide collimated beams 36'.

The first beam dividing matrix 32 further comprises a series of adjacently disposed convex cylindrical lenses 46a–b, where the convex cylindrical lenses 46a–b are aligned in rows to form the first beam dividing matrix 32, commonly referred to as a lenticular array. As the light beam 34 is transmitted through the first beam dividing matrix 32, the convex cylindrical lenses 46a–b cause the light beam 34 to be broken up into a plurality of smaller sub-beams 36. This is done by refracting the light passing through each convex cylindrical lens 46a–b to create a plurality of sub-beams 36, each sub-beam 36 being initially equal in size to the lens' width. Because the light is refracted, the width of the sub-beams 36 gradually narrows and concentrates the light as the light travels farther away from the convex cylindrical lenses 46a–b. The compact grouping of the convex cylindrical lenses 46a–b comprising the first beam dividing matrix 32 assures that substantially all of the incoming light beam 34 is captured and refracted into one of the many sub-beams 36.

The second beam focusing matrix 37 comprises a plurality of concave lenses 48 that are approximately one-half of the width of the convex cylindrical lenses 46a–b associated with the first beam dividing matrix 32. The concave lenses 48 are disposed in spaced-apart fashion such that each concave lens 48 intercepts a concentrated sub-beam 36 from the first beam dividing matrix 32. The distance between the second beam focusing matrix 37 and the first beam dividing matrix 32 is preferably the distance at which the concentration ratio of the light is 2:1. In other words, each concave lens 48 of the second beam focusing matrix 37 is positioned to intercept a sub-beam 36 at the point at which the width of the sub-beam 36 is one-half of its original width as it first leaves the first beam dividing matrix 32.

Figure 1B:
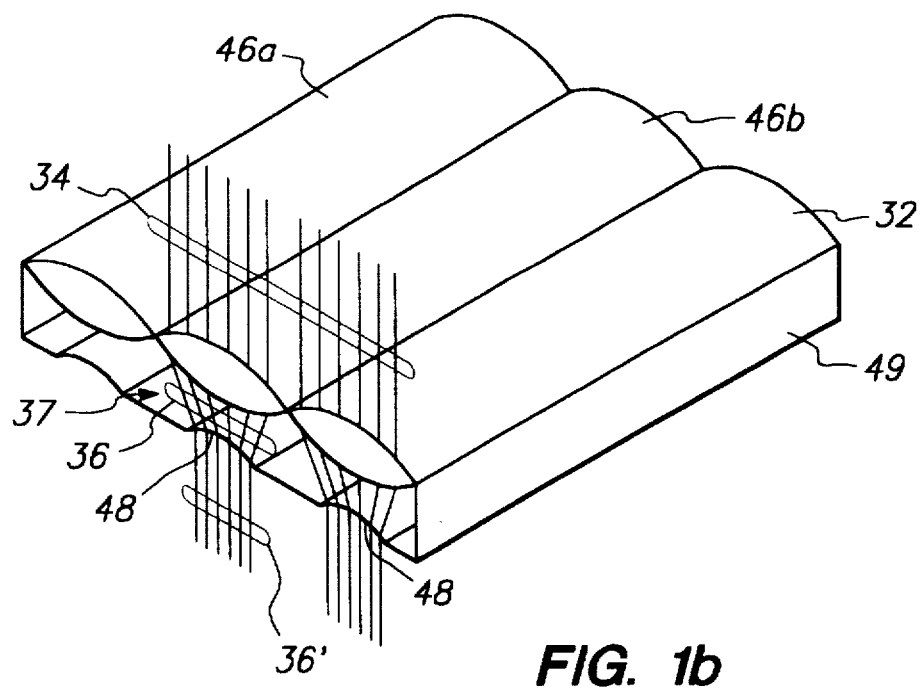
FIG. 1b is a perspective view of the light concentrator of FIG. 1a, illustrating the physical form of the component layers.

Referring now to FIG. 1b, a perspective view of the light concentrator 29 of FIG. 1a is shown to better illustrate the light concentrator's physical form. The series of adjacently disposed convex cylindrical lenses 46a–b (lenticular array) comprising the first beam dividing matrix 32 resides in a first plane. The series of spaced-apart concave lenses 48 comprising the second beam focusing matrix 37 is shown in a second plane, where the second plane is parallel to the first plane. The concave lenses 48 are aligned with the convex cylindrical lenses 46a–b such that the concentrated sub-beams 36 from the convex cylindrical lenses are intercepted by the concave lenses 48. The light concentrator 29 is typically manufactured as a panel 47, where the first beam dividing matrix 32 and the second beam focusing matrix 37 are joined about the panel's perimeter by sides 49.

In the prior art, a beam of light from a light source is aimed directly upon a polarization converter. Whether the polarization converter is comprised of a single input cell or multiple cells portions of the light will fall outside of the entrance to the input cell. The systems of the prior art are inherently inefficient, as not all of the light is captured and used in the polarization converter.

Figure 2A:
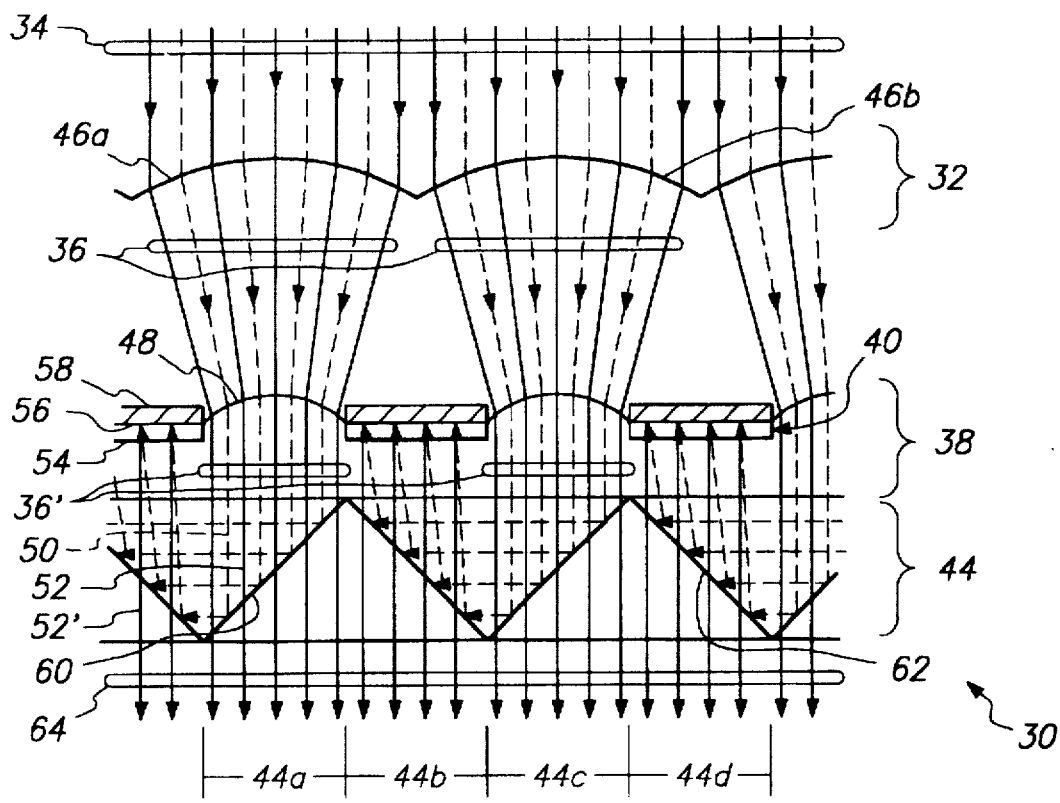
FIG. 2a is a cross-section of a high efficiency homogenous polarization converter in accordance with the present invention, which utilizes the light concentrator of FIG. 1a along with a novel lightwave polarizing cells.

Referring now to FIG. 2a, a cross-section of a segment of cells comprising a high efficiency homogeneous polarization converter 30 in accordance with the present invention is shown. A modified version of the light concentrator 29 shown in FIG. 1a is used in the preferred embodiment of the polarization converter 30 of the present invention. The polarization converter 30 of the present invention comprises a first beam dividing matrix 32, a second beam focusing matrix 38 that includes orientation converters 40 for converting select portions of the sub-beams 36, and a series of narrow and shallow polarizing cells 44a–d.

The first beam dividing matrix 32 comprises a series of convex cylindrical lenses 46a–b and is described with respect to FIG. 1a. The second beam focusing matrix 38, however, further comprises a plurality of concave lenses 48 for collimating each sub-beam 36 and orientation means 40 for converting the s-wave 50 light components within each collimated beam 36' to change them into a p-wave 52 orientation. The width of the concave lenses 48 in the second beam focusing matrix 38 are approximately one-half the width of the convex cylindrical lenses 46a–b of the first beam dividing matrix 32. The sub-beams 36 from the first beam dividing matrix 32 are directed onto the concave lenses 48 of the second beam focusing matrix 38. The concave lenses 48 collimate the sub-beams 36 so that the light rays comprising each collimated beam 36' are disposed generally in parallel. The collimated beams 36' exiting the concave lenses 48 are directed into the polarizing cells 44a–d.

The orientation converters 40 comprise quarter-wave retarders 54 in alignment with, and adjacent to, the reflective side 56 of an equal plurality of mirror segments 58. The concave lenses 48 are integrated in alternating arrangement with the orientation converters 40. Further, the concave lenses 48 and orientation converters 40 comprising the second beam focusing matrix 38 lay in a single plane which is parallel to the plane of the first beam dividing matrix 32, such that the second matrix's concave lenses 48 receive the refracted sub-beams 36 from the first beam dividing matrix 32. In an alternative embodiment, discussed below with respect to FIG. 4, the concave lenses 48 and orientation converters 40 alternatively lay in parallel planes.

The polarizing cells 44a–d are disposed in rows. Each polarizing cell 44a–d further includes either a first beamsplitter 60 or a second beamsplitter 62, where the first beamsplitters 60 and second beamsplitters 62 are disposed in opposing diagonal fashion and in an alternating manner. The polarizing cells 44a–d are aligned with the second beam focusing matrix 38 such that the collimated beams 36' are directed into a polarizing cell 44a, 44c having a first beamsplitter 60. Likewise, each polarizing cell 44b, 44d having a second beamsplitter 62 is aligned with one of the plurality of orientation converters 40. As the second beam focusing matrix 38 is comprised of alternating concave lenses 48 and orientation converters 40, and the polarizing cells 44a–d are comprised of alternating first beamsplitters 60 and second beamsplitters 62. The alignment of any one of the second matrix's concave lenses 48 with any one of the first beamsplitter polarizing cells 44a, 44c will cause the orientation converters 40 of the second beam focusing matrix 38 to be in alignment with a corresponding second beamsplitter polarizing cell 44b, 44d.

In operation, a light beam 34 passing through the convex cylindrical lenses 46a–b of the first beam dividing matrix 32 produces discrete sub-beams 36 having ever narrowing beam widths. The sub-beams 36 are portions of the light beam 34 that are partitioned therefrom into a series of parallel beams (the sub-beams 36). The sub-beams 36 are concentrated (narrowed) to focus onto corresponding concave lenses 48 in the second beam focusing matrix 38. The surface area of the narrowed sub-beams 36 at the concave lenses 48 is approximately one-half of the width of the sub-beam 36 proximate the convex cylindrical lenses 46a–b. Thus, the concentration ratio of the sub-beams 36 is preferably two times, in order to minimize the astigmatic distortion caused by the narrowing. In other words, the width of the sub-beam 36 passing through the convex cylindrical lenses 46a–b is preferably two times greater than the width of the same sub-beam 36 as is reaches the concave lenses 48.

The concave lenses 48 collimate the sub-beams 36, to cause parallel alignment of the light rays comprising the collimated beam 36'. The collimated beam 36' is directed into the polarizing cell 44a, 44c having the first beamsplitter 60. Lightwaves having a p-wave polarization 52 pass directly through the first beamsplitter 60 and out of the polarizing cell 44a, 44c. Lightwaves having an s-wave polarization 50 (all other lightwaves) will be horizontally reflected by the first beamsplitter 60 and directed onto the second beamsplitter 62. The second beamsplitter 62, in turn, once again reflects the s-waves 50, and directs them toward the orientation converters 40. In essence, as the s-waves 50 encounter the first beamsplitter 60, they are reflected at a ninety degree angle toward the second beamsplitter 62. Once encountering the second beamsplitter 62, the s-waves 50 are again reflected at a ninety degree angle, whereby they then travel in a direction that is opposite the direction at which they entered the first beamsplitter polarizing cell 44a, 44c.

The s-waves 50 pass through the quarter wave retarder 54, where the wavelength of each s-wave 50 is delayed by one-quarter, effectively causing the s-waves 50 to become circularly polarized in either a right-handed or left-handed circular polarization. The s-waves 50 then reflect off of the mirror 58 which changes the direction (handedness) of the circular polarization, and again pass through the quarter wave retarder 54. The second pass through the quarter wave retarder 54 returns the s-waves 50 to a linear polarization from their circular polarization, but with an effective ninety degree rotation of axis, as a result of the two passes of the s-waves 50 through the quarterwave retarder 54. As a result of the double pass of the s-waves 50 the quarter wave retarder 54, the s-waves 50 are now re-oriented as p-waves 52'.

Following the re-orientation of the s-waves 50 to p-waves 52', the re-oriented p-waves 52' pass through the second beamsplitter 62 and exit the polarizing cell 44b, 44d. The re-oriented p-waves 52' join the original p-waves 52 exiting the polarizing cells 44a, 44c, and thus form a full beam of polarized light 64.

Figure 2B:
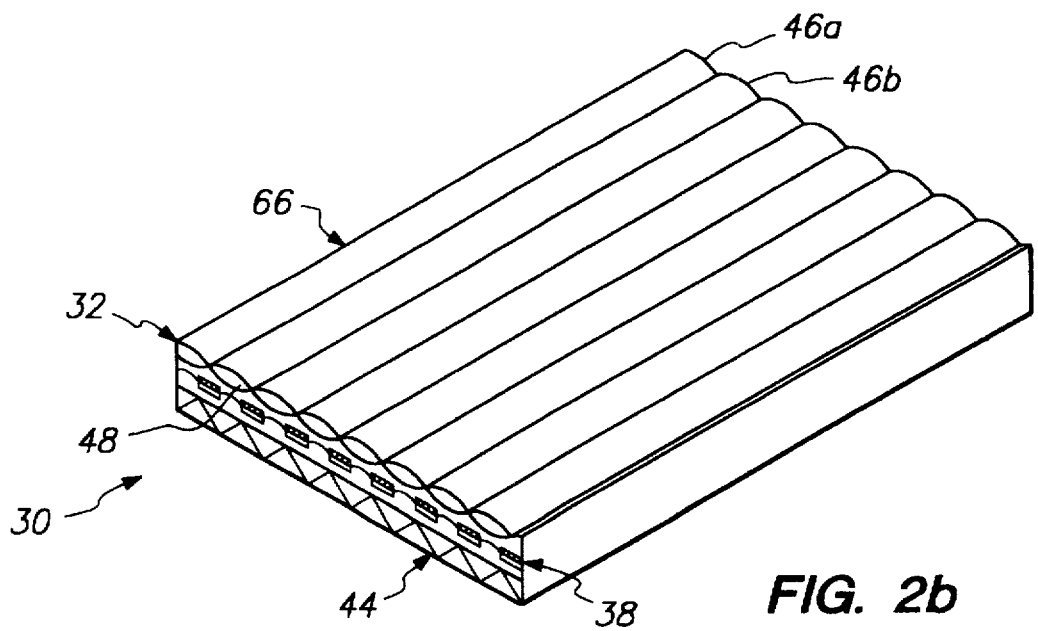
FIG. 2b is a perspective view of a polarization converter formed in a panel embodiment, illustrating the association of the two layer light concentrator and the polarizing cells.

Referring now to FIG. 2b, a perspective view of the polarization converter 30 of FIG. 2a is shown formed in a panel 66 embodiment. The first beam dividing matrix 32, second beam focusing matrix 38 and polarizing cells 44a–d are disposed in parallel planes and constructed as a single unit. The panel 66 is held together by sides 67. The panel 66 can be manufactured in a mass-producible manner by a combination of conventional lens molding and vacuum deposition processes.

Figure 2C:
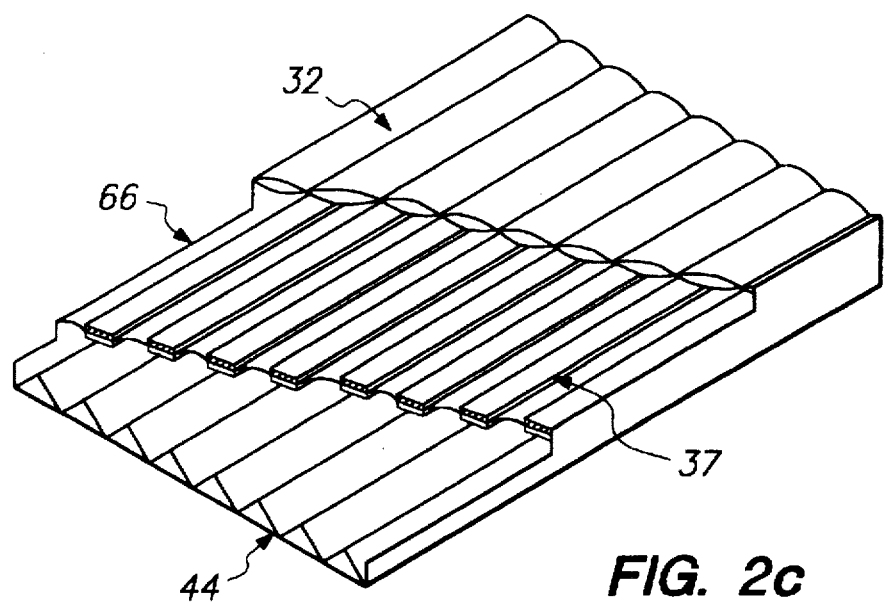
FIG. 2c is a perspective view of the three layer panel of FIG. 2b, where the first beam dividing matrix is broken away to show the configuration of the second beam focusing matrix, and the second beam focusing matrix is further broken away to illustrate the configuration of the polarizing cells.

Referring now to FIG. 2c, illustrated is a perspective view of the three layer panel 66 of FIG. 2b, broken away. The first beam dividing matrix 32 is broken away to show the configuration of the second beam focusing matrix 37. The second beam focusing matrix 37 is further broken away to illustrate the configuration of the polarizing cells 44.

Figure 3:
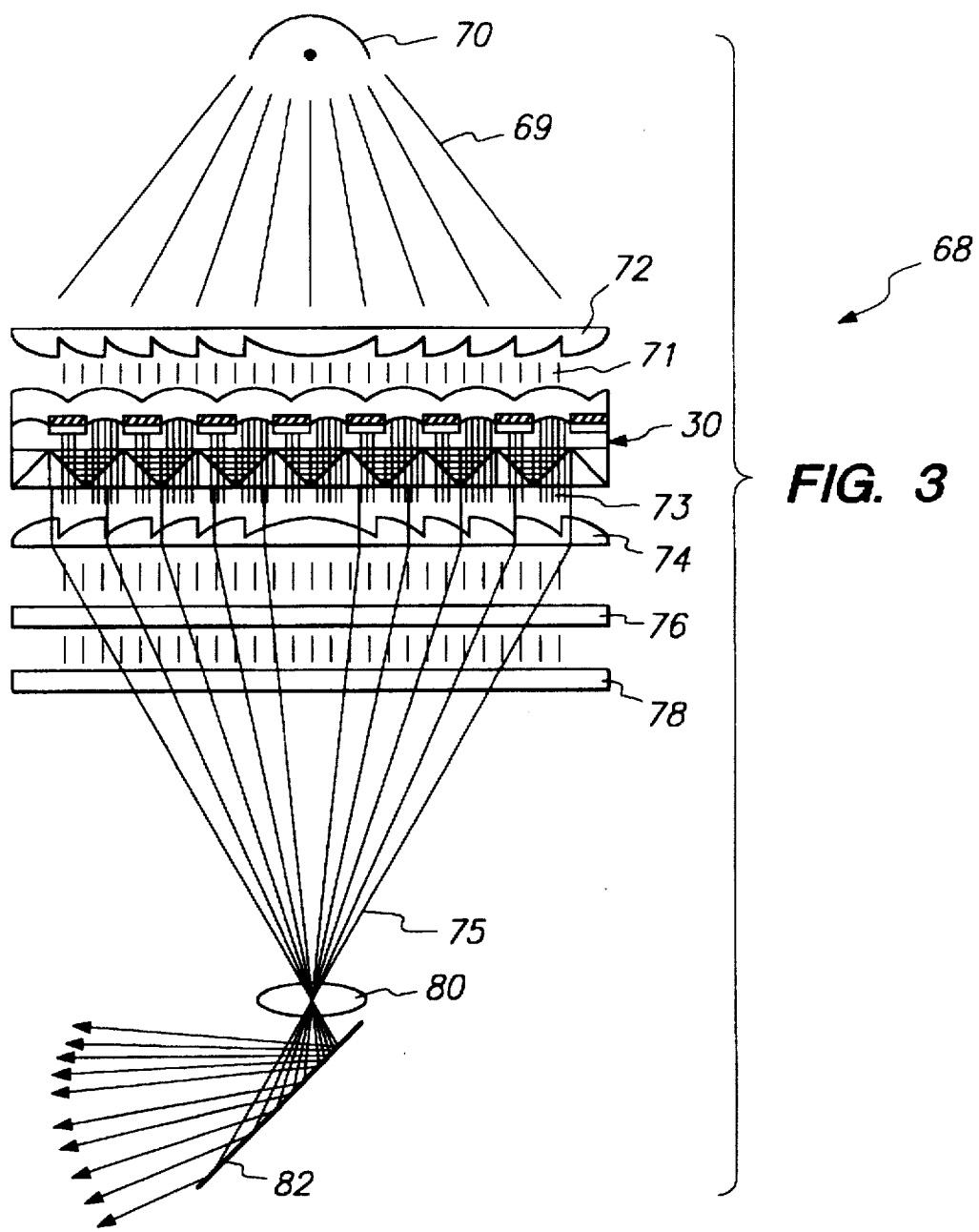
FIG. 3 is a schematic of a projection system utilizing the high efficiency homogenous polarization converter of the present invention.

Referring now to FIG. 3, a schematic of a projection system 68 utilizing the polarization converter 30 of the present invention is shown. Light 69 from a lamp source 70 is collimated by a first Fresnel lens 72, and directed toward the polarization converter 30. As discussed in detail with respect to FIG. 2a, the high efficiency homogenous polarization converter 30 linearly polarizes the collimated light 71. Locating the first Fresnel lens 72 between the lamp source 70 and the polarization converter 30 provides that the light hitting the polarization converter 30 is comprised of parallel light rays. The efficiency and effectiveness of the beamsplitters are maximized where the incoming light rays are parallel. The polarized light 73 passes through a second Fresnel lens 74 which condenses and concentrates the light. The polarized light 73 then passes through a display LCD 76 and a conventional analysis polarizer 78. The LCD 76 imparts an image by projecting an object plane, and can alternatively be positioned between the polarization converter 30 and the second Fresnel lens 74. The analysis polarizer 78, the polarization converter 30 and the LCD 76 provide visible contrast differences that are projected as an image onto a screen (not shown). The LCD 76 is typically composed as a matrix display using twisted nematic or super-twisted nematic liquid crystal material which requires a polarizer and an analyzer to be able to display an image with contrast. The analysis polarizer 78 is preferably a conventional stretched and dyed film, typically made of polyvinyl alcohol.

The polarized light 75 passing through the LCD 76 and analysis polarizer 78 converges at the projection lens 80 and diverges beyond the projection lens 80. A folding mirror 82 typically disposed at a 45 degree angle, directs the polarized light 75 toward a projection screen or blank wall (not shown) for viewing. Use of the folding mirror 82 allows the elevation of the projected image to be changed, such as in an overhead projector, so as to position the image at the best height for viewing by the intended audience.

Figure 4:
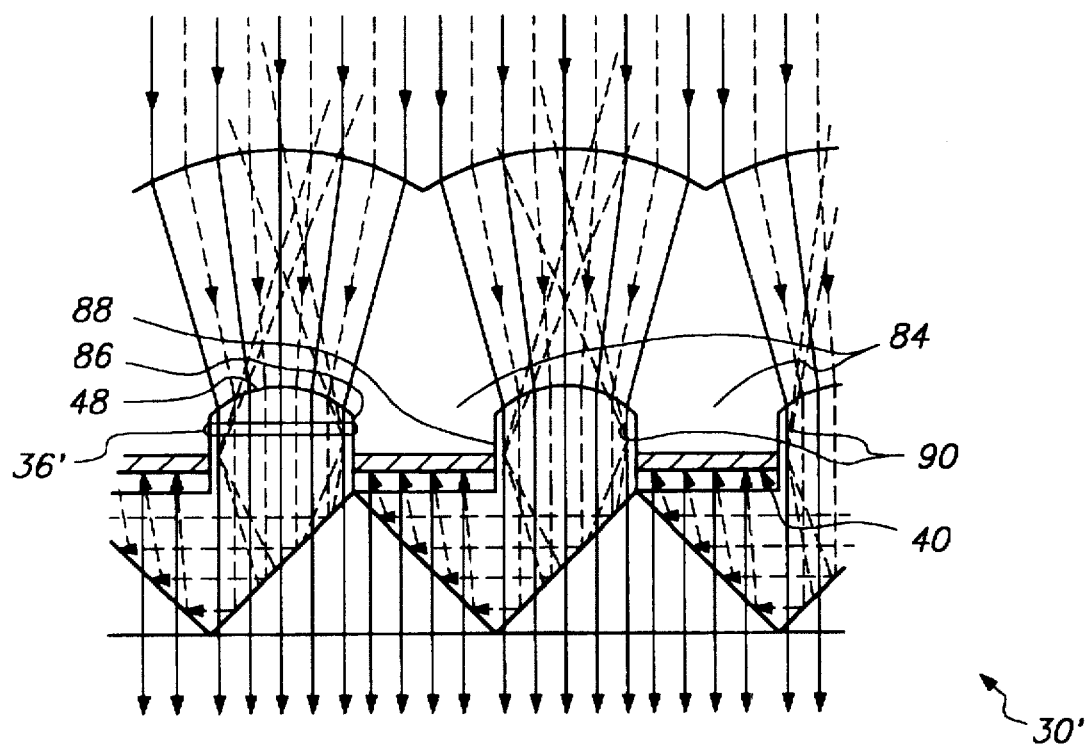
FIG. 4 is an alternative embodiment of the polarization converter of FIG. 2a having recessed lenses and mirrored walls for conserving scattered light.

Referring now to FIG. 4, an alternative embodiment of a polarization converter 30' of FIG. 2a is shown. The concave lenses 48 are recessed with respect to the orientation converters 40. Walls 84 are provided to span the distance between the concave lenses 48 and the orientation converters 40. The walls 84 are mirrored to conserve scattered light. Although the collimated beams 36' passing through the concave lenses 48 are generally parallel, some scattered rays of light will pass at an angle. The scattered light is reflected by the mirrored walls 84 and directed back in toward the collimated beam 36'. In this manner, the scattered light is conserved and used by the polarization converter 30' to polarize the maximum amount of light available.

The invention has now been explained with reference to specific embodiments. Other embodiments will be apparent to those of ordinary skill in the art in light of this disclosure. For example, although the described embodiment illustrates the use of refractory material in the first beam dividing matrix and second beam focusing matrix, holographic means for concentrating the light may equivalently be used. Therefore, it is not intended that this invention be limited, except as indicated by the appended claims.

What is claimed is:

1. A polarization converter providing efficient conversion of non-polarized light to polarized light, comprising:

a beam dividing matrix for dividing the non-polarized light into a plurality of sub-beams;

a beam focusing matrix for focusing the sub-beams received from the beam dividing matrix;

an array of polarizing cells for separating each sub-beam of non-polarized light into first and second light components having planes of polarization orthogonal to each other, each polarizing cell including:

a first cell having a first beamsplitter positioned diagonally therewithin for reflecting the first light component and passing the second light component; and a second cell disposed adjacent the first cell, the second cell having a second beamsplitter positioned diagonally opposite the first beamsplitter for reflecting the first light component a second time; and means for rotating the plane of polarization of the first light component to be coincident with the plane of polarization of the second light component, the rotated first light component passing through the second beamsplitter and combining with the second light component.

2. The polarization converter according to claim 1, wherein the beam focusing matrix comprises a plurality of concave directing lenses.

3. The polarization converter according to claim 2, wherein the means for rotating the polarization are disposed in alternating arrangement with the plurality of concave directing lenses.

4. The polarization converter according to claim 2, wherein the means for rotating the polarization and the plurality of concave directing lenses are co-planar.

5. The polarization converter according to claim 2, wherein the plurality of concave directing lenses are recessed with respect to the means for rotating the polarization, and further comprising walls disposed between the plurality of concave directing lenses and the means for rotating the polarization.

6. The polarization converter according to claim 1, wherein the beam dividing matrix comprises a plurality of convex dividing lenses.

7. A method of efficiently converting non-polarized light into polarized light comprising the steps of:

dividing the non-polarized light into a plurality of sub-beams; and for each of the plurality of sub-beams:
   directing the sub-beam into a first cell;
   separating the sub-beam into first and second light components having mutually orthogonal planes of polarization;
   directing the first light component from the first cell to a second cell disposed adjacent and diagonally opposite the first cell;
   directing the second light component from the first cell;
   directing the first light component from the second cell;
   rotating the plane of polarization of the first light component to be coincident with the plane of polarization of the second light component by twice passing the first light component through a quarter wave retarder;
   directing the rotated first light component through the second cell; and
   combining the rotated first light component with the second light component.

8. The method according to claim 7, further comprising the step of:

for each of the sub-beams, collimating the combined first and second light components to provide a polarized output beam.

9. The method according to claim 7, wherein the step of separating the sub-beam includes the step of directing the sub-beam to a first beamsplitter.

10. The method according to claim 7, wherein the step of directing the first light component from the second cell includes the step of directing the first light component from a second beamsplitter.

11. The method of claim 7, wherein the first light component is caused to pass through the quarter wave retarder a first time, to be reflected from a mirror, and to pass through the quarter wave retarder a second time.

12. The method of claim 7, wherein the step of directing the first light component includes the step of directing the rotated first light component includes the step of directing the rotated first light component through the second beamsplitter.

* * * * *